United States Patent
Ueda

(10) Patent No.: US 8,488,287 B2
(45) Date of Patent: Jul. 16, 2013

(54) OVERCURRENT PROTECTION CIRCUIT AND METHOD OF PROTECTING POWER SUPPLY CIRCUIT

(75) Inventor: Yasuyuki Ueda, Isesaki (JP)

(73) Assignees: Semiconductor Components Industries, LLC., Phoenix, AZ (US); SANYO Semiconductor Co., Ltd., Gunma (JP)

( * ) Notice: Subject to any disclaimer, the term of this patent is extended or adjusted under 35 U.S.C. 154(b) by 641 days.

(21) Appl. No.: 12/791,402

(22) Filed: Jun. 1, 2010

(65) Prior Publication Data

US 2010/0302698 A1 Dec. 2, 2010

(30) Foreign Application Priority Data

May 29, 2009 (JP) ................................. 2009-129974

(51) Int. Cl.
*H02H 3/00* (2006.01)

(52) U.S. Cl.
USPC .......................................................... 361/86

(58) Field of Classification Search
USPC .......................................................... 361/86
See application file for complete search history.

(56) References Cited

U.S. PATENT DOCUMENTS

| | | | | |
|---|---|---|---|---|
| 5,835,361 | A * | 11/1998 | Fitzgerald | 363/21.03 |
| 6,922,042 | B2 * | 7/2005 | Umemoto et al. | 323/283 |
| 7,239,495 | B2 * | 7/2007 | Mori et al. | 361/93.1 |
| 7,307,462 | B2 * | 12/2007 | Cheng et al. | 327/175 |
| 7,876,080 | B2 * | 1/2011 | Dwarakanath et al. | 323/284 |
| 8,368,475 | B2 * | 2/2013 | Nakada et al. | 331/111 |
| 2002/0036486 | A1 * | 3/2002 | Zhou et al. | 323/272 |
| 2004/0008528 | A1 * | 1/2004 | Umemoto et al. | 363/49 |
| 2004/0252434 | A1 * | 12/2004 | Mori et al. | 361/93.1 |
| 2005/0007037 | A1 * | 1/2005 | Ribarich | 315/291 |
| 2005/0258941 | A1 * | 11/2005 | Berard | 340/333 |
| 2006/0023383 | A1 * | 2/2006 | Thiery et al. | 361/100 |
| 2008/0037807 | A1 * | 2/2008 | Honda | 381/120 |
| 2008/0042710 | A1 * | 2/2008 | Cheng et al. | 327/175 |
| 2008/0284357 | A1 * | 11/2008 | Ribarich | 315/309 |
| 2009/0001948 | A1 * | 1/2009 | Martinez et al. | 323/271 |
| 2009/0039853 | A1 * | 2/2009 | Omi | 323/284 |
| 2009/0278521 | A1 * | 11/2009 | Omi et al. | 323/288 |
| 2010/0253301 | A1 * | 10/2010 | Nakada et al. | 323/282 |
| 2010/0302698 | A1 * | 12/2010 | Ueda | 361/93.1 |
| 2012/0049829 | A1 * | 3/2012 | Murakami | 323/288 |

FOREIGN PATENT DOCUMENTS

JP 2004-015881 A 1/2004

* cited by examiner

*Primary Examiner* — Ronald W Leja
(74) *Attorney, Agent, or Firm* — Westerman, Hattori, Daniels & Adrian, LLP

(57) ABSTRACT

In some embodiments, an overcurrent protection circuit is configured to operate in accordance with operation modes including a first operation mode in which when the power supply circuit is activated, the capacitor is charged until the terminal voltage reaches a first voltage, a second operation mode in which depending on a time period in which a current flowing through an output transistor of the power supply circuit exceeds a predetermined value, the capacitor is charged so that the terminal voltage increases from the first voltage toward a second voltage, and the power supply circuit is shut down when the terminal voltage reaches the second voltage, and a third operation mode in which when the power supply circuit is shut down, the capacitor is discharged until the terminal voltage reaches a third voltage, and the shutdown of the power supply circuit is released when the terminal voltage reaches the third voltage.

8 Claims, 4 Drawing Sheets

OVERCURRENT PROTECTION CIRCUIT AND METHOD OF PROTECTING POWER SUPPLY CIRCUIT

This application claims priority under 35 U.S.C. §119 to Japanese Patent Application No. 2009-129974 filed on May 29, 2009, the entire disclosure of which is incorporated herein by reference in its entirety.

BACKGROUND OF THE INVENTION

1. Field of the Invention

The present invention relates to an overcurrent protection circuit for, e.g., preventing breakage of a power supply circuit due to an overcurrent or excess current, and also relates to a method of protecting a power supply circuit from an overcurrent flowing through an output transistor of the power supply circuit.

2. Description of the Related Art

The following description sets forth the inventor's knowledge of related art and problems therein and should not be construed as an admission of knowledge in the prior art.

Currently, a power supply circuit is used in various electric equipments. In general, a power supply circuit is equipped with various protection functions for preventing breakage of the power supply circuit due to an overcurrent or excess current.

As such a protection function, commonly used is an overcurrent detection function of turning off an output transistor when it is detected that an overcurrent or excess current flows through the output transistor due to, e.g., short circuit.

When an output voltage suddenly reaches a predetermined voltage value at the time of start-up of a power supply circuit, an overcurrent occurs since the output is virtually grounded via a large-capacity capacitor. To avoid this problem, a soft-start function which makes the output voltage gradually raise at the time of start-up of a power supply circuit has become popular.

FIG. 4 shows an example of a power supply circuit equipped with an overcurrent protection function and a soft-start function, which is described by way of example and should not be considered as a prior art. This power supply circuit 100 includes a control circuit 110, a diode 120, a coil 121, a capacitor 122, resistors 123 and 124 which are externally connected to the control circuit 110. The control circuit 110 includes an output transistor 141, an error amplifier 142, an internal electric power source 143, a current source 144, an oscillation circuit 145, a comparator 146, an output control circuit 147, and an overcurrent detection circuit 148.

Now, the general operation of the power supply circuit 100 will be explained. In the output transistor 141, an input voltage is applied to the drain, the control voltage from the output control circuit 147 is applied to the gate, and an output terminal is connected to the source. When the output transistor 141 is turned on depending on the control voltage, an electric current flows through the coil 121 to charge the capacitor 122, which raises the output voltage with respect to a load. On the other hand, when the output transistor 141 is turned off depending on the control voltage, the output voltage with respect to the load drops. The error amplifier 142 is configured to amplify the error between the feedback voltage obtained by dividing the output voltage by resistors 123 and 124 and a reference voltage of the internal electric power source 143 and then output. The comparator 146 is configured to compare the output of the error amplifier 142 with an oscillating signal, such as a triangular wave, outputted from the oscillating circuit 145 and output a PWM signal. The output control circuit 147 is configured to perform PWM control of the output transistor 141 based on the PWM signal. Thus, the power source circuit 100 performs ON-OFF control of the output transistor 141 depending on the error between the feedback voltage and the reference voltage to reduce the error between the feedback voltage and the reference voltage, so that the output voltage reaches the predetermined voltage.

Now, the overcurrent detection function of the power supply circuit 100 will be explained. When the overcurrent detection circuit 148 detects an overcurrent of the output transistor 141 due to, e.g., a short circuit, the circuit 148 outputs a signal for turning off the output transistor 141 to the output control circuit 147 to prevent breakage of the output transistor 141.

The soft-start function of the power supply circuit 110 will be explained below. At the start-up time of the power supply circuit 100, the error between the feedback voltage and the reference voltage is large. Therefore, when PWM control is performed based on the large error, the turn-on time of the output transistor 141 becomes very long. As a result, the possibility of causing an overcurrent is high since the output is virtually grounded to a large-capacity capacitor 122. To avoid this problem, a capacitor 130 is connected to the error amplifier 142. The error amplifier 142 compares one of the reference voltage and the voltage of the capacitor 130 which is lower with the feedback voltage. With this structure, at the time of the start-up of the power supply circuit 100, the potential of the capacitor 130 gradually raises by the current supplied from the current source 144, resulting amplification of the error between the potential of the capacitor 130 and the feedback voltage by the error amplifier 142, which prevents occurrence of an overcurrent (see, e.g., Japanese Unexamined Laid-open Patent Application Publication No. 2004-15881).

In the meantime, the output transistor 141 sometimes flows a high current instantaneously. This is different from an overcurrent due to, e.g., short circuit. However, when the overcurrent detection circuit 148 recognizes as an overcurrent to turn off the output transistor 141, the power supply circuit 100 may causes a problem in operation.

Furthermore, when an overcurrent occurs, the power supply circuit 100 turns off the output transistor 141. However, if the output transistor 141 returns to an on-state immediately after the turn-off state, removal of heat generated in a system in which the power supply circuit 100 is mounted becomes sometimes insufficient.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an overcurrent protection circuit capable of detecting an overcurrent detection status with high accuracy without increasing external parts and also capable of sufficiently removing heat generated.

Among other potential advantages, some embodiments can provide an overcurrent protection circuit applied to a power supply circuit which performs soft-start at the time of activation depending on a terminal voltage of a terminal to which a capacitor is connected, the overcurrent protection circuit is configured to operate in accordance with operation modes comprising:

a first operation mode in which when the power supply circuit is activated, the capacitor is charged until the terminal voltage reaches a first voltage;

a second operation mode in which depending on a time period in which a current flowing through an output transistor of the power supply circuit exceeds a predetermined value, the capacitor is charged so that the terminal voltage increases from the first voltage toward a second voltage, and the power supply circuit is shut down when the terminal voltage reaches the second voltage; and a third operation mode in which when the power supply circuit is shut down, the capacitor is discharged until the terminal voltage reaches a third voltage, and the shutdown of the power supply circuit is released when the terminal voltage reaches the third voltage.

In some examples, in the second operation mode, it is detected whether a current flowing through the output transistor exceeds the predetermined value in accordance with a period of a PWM signal to be inputted to a control terminal of the output transistor.

In some examples, when the power supply circuit is shut down, the output transistor stops the switching-control.

With the aforementioned structure, utilizing the same capacitor, an overcurrent protection circuit capable of supplying a soft-start function, an overcurrent erroneous detection prevention function and shutdown term adjusting function to a power supply circuit.

According to another aspect of the present invention, some embodiments can provide a method of protecting a power supply circuit from an overcurrent flowing through an output transistor of the power supply circuit, wherein the power supply circuit performs soft-start at the time of activation depending on a terminal voltage of a terminal to which a capacitor is connected, the method comprising:

charging the capacitor until the terminal voltage reaches a first voltage when the power supply circuit is activated, which is defined as a first operation mode;

depending on a time period in which a current flowing through an output transistor of the power supply circuit exceeds a predetermined value, charging the capacitor so that the terminal voltage increases from the first voltage toward a second voltage, and shutting down the power supply circuit when the terminal voltage reaches the second voltage, which is defined as a second operation mode; and discharging the capacitor until the terminal voltage reaches a third voltage when the power supply circuit is shut down, and releasing the shutdown of the power supply circuit when the terminal voltage reaches the third voltage, which is defined as a third operation mode.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 4:
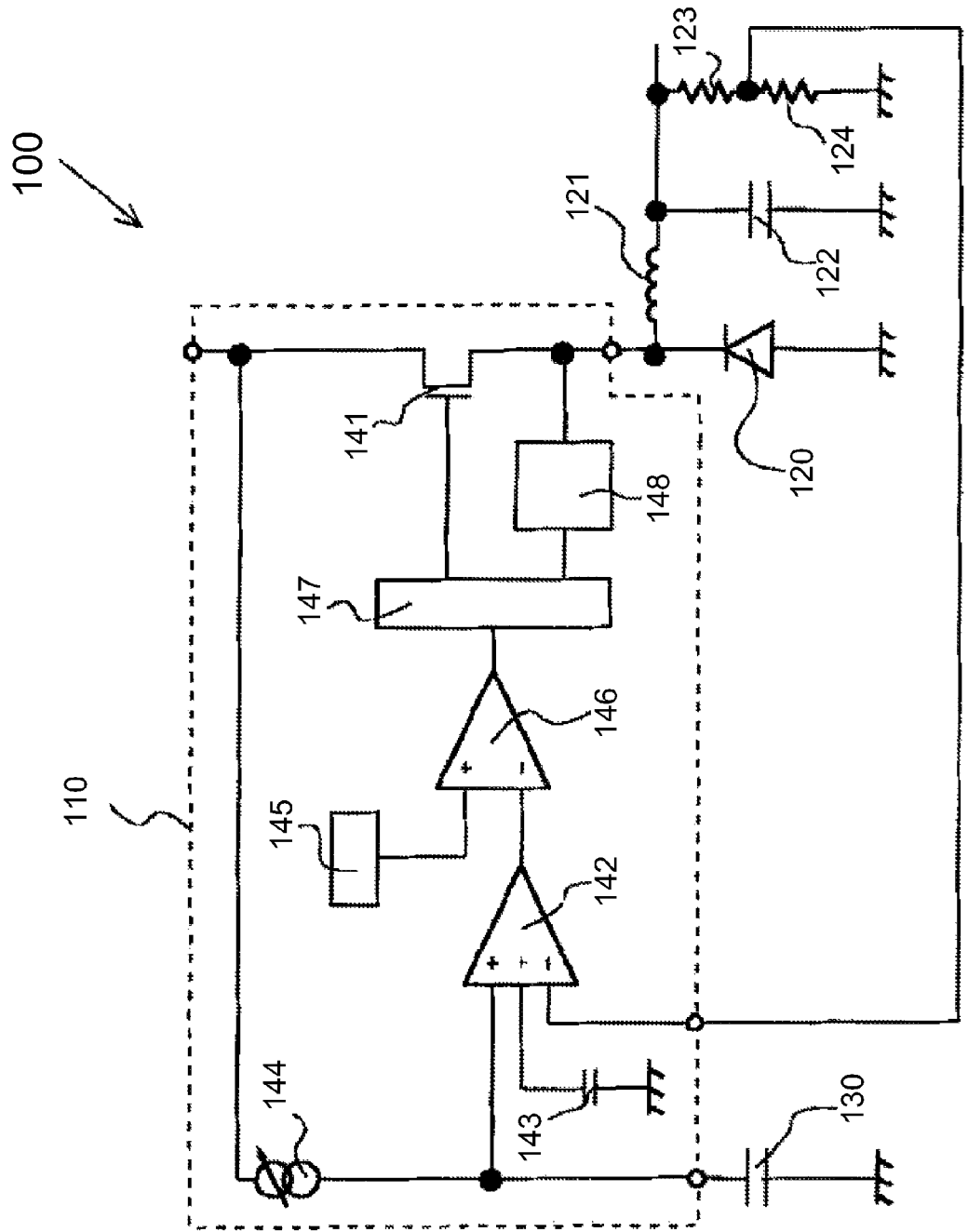
FIG. 4 is an example of a circuit diagram of a power supply circuit to which the overcurrent protection circuit according to the embodiment of the present invention is applied.

Hereinafter, a preferable embodiment of the present invention will be explained with reference to the attached drawings. In the following explanation, although the entire structure of a power supply circuit in which an overcurrent protection circuit is mounted will not be explained, an overcurrent protection circuit can be mounted in, for example, the power supply circuit 100 having a soft-start function as shown in FIG. 4.

The structure of an overcurrent protection circuit according to the present invention will be detailed as follows.

Figure 1:
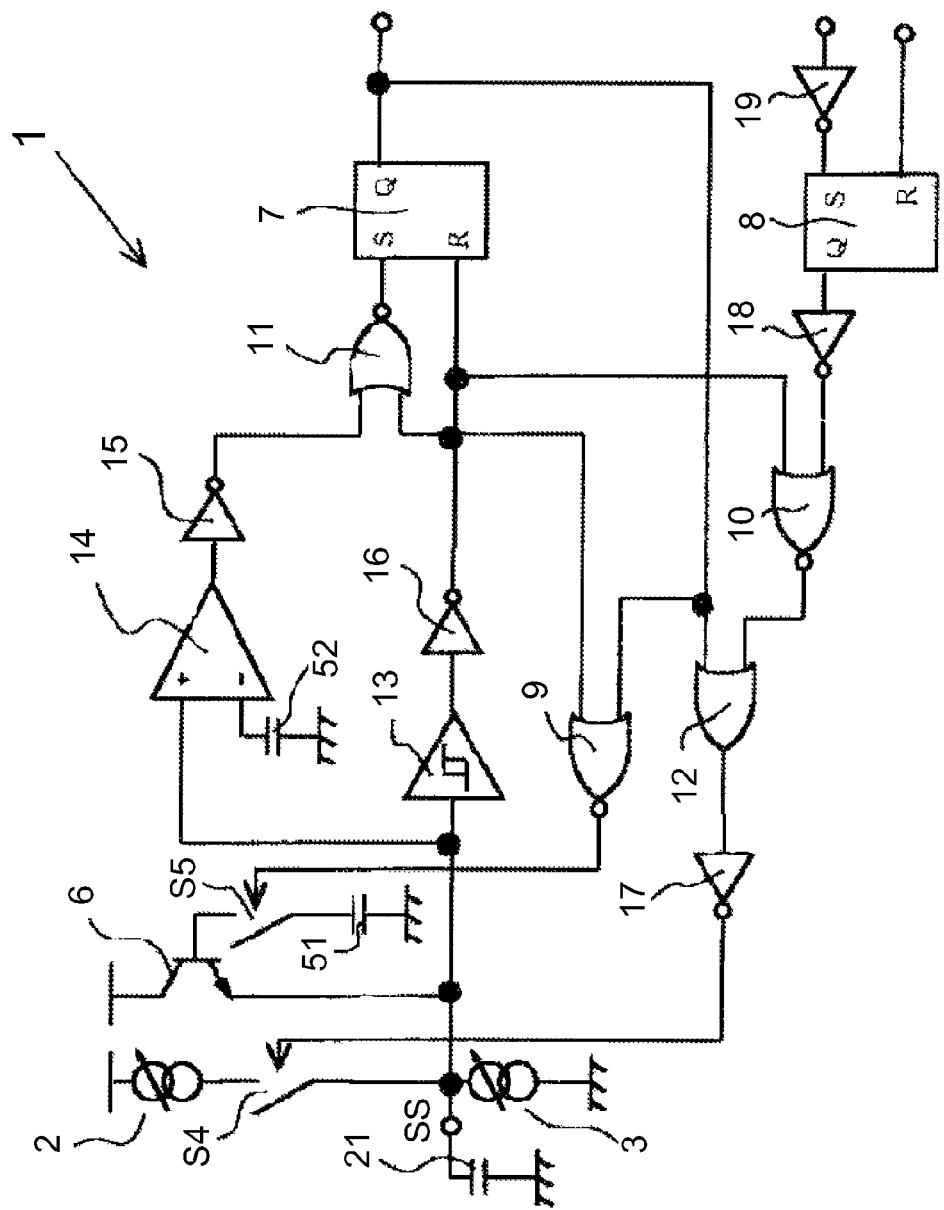
FIG. 1 is a circuit diagram of an overcurrent protection circuit according to an embodiment of the present invention.

FIG. 1 is a circuit diagram showing an overcurrent protection circuit 1. This overcurrent protection circuit 1 includes current sources 2 and 3, switches S4 and S5, a transistor 6, flip-flops 7 and 8, NOR gates 9, 10 and 11, an OR gate 12, a hysteresis amplifier 13, a comparator 14, NOT gates 15, 16, 17, 18, and 19, and a terminal SS. To the terminal SS, an external capacitor 21 is connected.

A capacitor 21 is connected to the terminal SS. The capacitor 21 is provided to take a function of soft-start in a power supply circuit, and corresponds to the capacitor in the power supply circuit 100 shown in FIG. 4.

The current source 2 is connected to the terminal SS via the switch S4, and causes a flow of current Ic for charging the capacitor 21. The current source 3 is connected to the terminal SS to cause a flow of current Id for discharging the capacitor 21. The current Ic is set to be larger than the current Id. In this embodiment, it is configured such that the current Ic is 6 µA and the current Id is 0.6 µA. With this structure, the current sources 2 and 3 function to charge the capacitor 21 when the switch S4 is turned on and to discharge the capacitor 21 when the switch S4 is turned off. Thus, depending on the charging and discharging of the capacitor 21, the terminal voltage Vs of the terminal SS changes.

In the transistor 6, the base is connected to a voltage source 51 via a switch S5, and the emitter is connected to the terminal SS. With this structure, when the switch S5 is turned on, the terminal voltage Vs is maintained to a voltage corresponding to the voltage source 51. In this embodiment, when the switch S5 is turned on, the terminal voltage Vs is maintained to 1.1 V.

In the hysteresis amplifier 13, the input stage is connected to the terminal SS, and the output stage is connected to the input terminal of the NOR gate 11 and the reset terminal of the flip-flop 7 via the NOT gate 16. In this embodiment, the hysteresis amplifier 13 outputs an H-level signal when the terminal voltage Vs raises and exceeds 1.1 V, and outputs an L-level signal when the terminal voltage Vs drops and becomes lower than 0.2 V.

In the comparator 14, the non-inverting terminal is connected to the terminal SS, the inverting terminal is connected to the voltage source 52, and the output terminal is connected to the input terminal of the NOR gate 11 via the NOT gate 15. In this embodiment, the voltage of the voltage source 52 is set to 1.3 V. With this structure, the comparator 14 outputs an H-level signal when the terminal voltage Vs exceeds 1.3 V.

In the NOR gate 11, the output of the comparator 14 is inputted via the NOT gate 15, the output of the hysteresis amplifier 13 is inputted via the NOT gate 16, and the output terminal of the NOR gate 11 is connected to the start terminal of the flip-flop 7. With this structure, the NOR gate 11 outputs an H-level signal to the start-terminal of the flip-flop 7 when the terminal voltage Vs exceeds 1.3 V.

In the flip-flop 7, the output of the NOR gate 11 is inputted to the start terminal S, and the output of the hysteresis amplifier 13 is inputted to the reset terminal R via the NOT gate 16. With this structure, the flip-flop 7 outputs an H-level signal when the terminal voltage Vs raises and reaches 1.3 V, and thereafter when the terminal voltage Vs drops and becomes below 0.2 V, the flip-flop 7 is reset and outputs an L-level signal from the output terminal. In the period in which the flip-flop 7 outputs an H-level signal from the output terminal, the power supply circuit is controlled so as to be shut down. Here, the shutdown means that, for example, in the power supply circuit 100 shown in FIG. 4, the power supply circuit 100 is in a state in which the power supply circuit do not output an output voltage by causing the output control circuit 147 not to output a PWM signal to the output transistor for a certain period of time.

In the flip-flop 8, a PWM signal is inputted to the start terminal via the NOT gate 19, and an overcurrent detection signal is inputted to the reset terminal R. Here, the PWM signal corresponds to a signal to be inputted to a gate of an output transistor (for example, in the power supply circuit 100 shown in FIG. 4, it corresponds to the output transistor 141). Although the detailed explanation will be omitted, with the structure, the flip-flop 8 outputs an L-level signal from the output terminal depending on the period of time in which an overcurrent is occurring. Here, an overcurrent means a current flowing through an output transistor and exceeding a predetermined amount.

In the NOR gate 10, an output of the NOT gate 16 is inputted to one of input terminals, and an output of the NOT gate 18 is inputted to the other input terminal. With this structure, the NOR gate 10 outputs an H-level signal from the output terminal only in the period of time during which no overcurrent is occurring after the terminal voltage Vs exceeded 1.1 V but before became below 0.2 V.

In the OR gate 12, an output of the flip-flop 7 is inputted to one of the input terminals, and an output of the NOR gate 10 is inputted to the other input terminal. With this structure, the NOR gate 12 outputs an L-level signal from the output terminal during the period of time after the terminal voltage Vs exceeded 1.1 V but before became below 0.2 V, or during the period of time while an overcurrent is occurring. With this structure, the L-level signal is inverted by the NOT gate 17 and inputted to the switch S4, turning on the switch S4. This causes the capacitor 21 to be charged by the current supplied from the current source 2.

In the NOR gate 9, an output of the NOT gate 16 is inputted to one of input terminals, and an output of the flip-flop 7 is inputted to the other input terminal. With this structure, the NOR gate 9 outputs an H-level signal from the output terminal during the period of time after the terminal voltage Vs exceeded 1.1 V but before became below 0.2 V and the terminal voltage Vs has not reached 1.3 V. With this structure, the H-level signal causes the switch S5 to turn on. This causes the base to be connected to the voltage source 51.

Next, the operation of the overcurrent protection circuit 1 shown in FIG. 1 will be explained concretely with referring to FIG. 2.

The time frame A is a period of time corresponding to the immediately after the activation of the power supply circuit in which the overcurrent protection circuit 1 is mounted. Immediately after the activation of the power supply circuit, since the capacitor 21 is in a state of substantially not charged, the hysteresis amplifier 13 and the comparator 14 output an L-level signal to the NOR gate 11 and therefore the NOR gate 11 outputs an L-level signal since only H-level signals are inputted. At this time, in the flip-flop 7, an L-level signal is inputted to the start terminal S, and an H-level signal is inputted to the reset terminal, which makes the flip-flop 7 output an L-level signal. In other words, in the time frame A, the overcurrent protection circuit 1 does not instruct the power supply circuit to be shut down.

In the NOR gate 10, an H-level signal is inputted from the NOT gate 16. Therefore, the NOR gate 10 outputs an L-level signal regardless of the output of the flip-flop 8. In the OR gate 12, L-level signals are inputted from the flip-flop 7 and the NOR gate 10. For this reason, the OR gate 12 outputs an L-level signal.

As will be understood from the above explanation, in the overcurrent protection circuit 1, when the power supply circuit is activated, the switch S4 is turned on, which causes charging of the capacitor 21. In other words, as shown in FIG. 2, during the time frame A immediately after the turning on the switch S4, the terminal voltage Vs raises. During the time frame A, the power supply circuit performs soft-start based on the terminal voltage Vs.

The time frame B is a period of time corresponding to the immediately after the completion of the soft start of the power supply circuit and the power supply circuit is performing the normal operation. During the time frame A, the capacitor 21 is charged, which raises the terminal voltage Vs. When the terminal voltage Vs exceeds 1.1 V, the hysteresis amplifier 13 outputs an H-level signal. The terminal voltage Vs is still below 1.3 V during the time frame B, and therefore the comparator 14 outputs an L-level signal. This causes the flip-flop 7 to output an L-level signal. Accordingly, the overcurrent protection circuit 1 does not instruct the power supply circuit to shut down.

In the NOR gate 9, L-level signals are inputted from the NOT gate 16 and the flip-flop 7. Therefore, the NOR gate 9 turns on the switch S5. As a result, during the period of time in which the switch S4 is in a turn-off state, the terminal voltage Vs is maintained to 1.1 V. In the NOR gate 10, an L-level signal is inputted from the NOT gate 16, and the flip-flop 8 outputs an L-level signal corresponding to the period of time during which an overcurrent is flowing through the output transistor. Thus, when no overcurrent is flowing through the output transistor, the NOR gate 10 continuously outputs an H-level signal, and when an overcurrent flows through the output transistor, the NOR gate 10 outputs an L-level signal depending on the corresponding period of time.

In the OR gate 12, an L-level signal is inputted form the flip-flop 7 and an H-level or L-level signal is inputted from the NOR gate 10. In other words, the OR gate 12 outputs an H-level signal when no overcurrent is flowing through the output transistor and outputs an L-level signal depending on the period of time when an overcurrent is flowing through the output transistor. Thus, the switch S4 will be turned off when an overcurrent is flowing through an output transistor. As a result, the terminal voltage Vs is maintained to 1.1 V. When an overcurrent flows through an output transistor, the switch S4 will be turned on depending on the period of time. As a result, the terminal voltage Vs raises from 1.1 V. At this time, for example, in cases where an overcurrent merely occurred accidentally, although the switch S4 will be turned on once, the switch S4 will be turned off thereafter. Therefore, the capacitor 21 will be discharged from the current source 3, which maintains the terminal voltage Vs to 1.1 V. On the other hand, in cases where an overcurrent is continuously occurring, the switch S4 will be frequently turned on, which continuously raises the terminal voltage Vs.

As will be understood from the above, in the time frame B, only in cases where an overcurrent occurs continuously, the terminal voltage Vs raises to 1.3 V. With this, it becomes possible to avoid shutdown of the power supply circuit in cases where, for example, the overcurrent protection circuit 1 erroneously detects an overcurrent.

The time frame C corresponds to the period of time after occurring of the continuous overcurrent. When an overcurrent occurs continuously and the terminal voltage Vs raises to 1.3 V in the time frame C, the NOT gate 15 outputs an L-level signal. As a result, in the NOR gate 11, an H-level is outputted since only L-level signals are inputted. Therefore, the NOR gate 11 outputs an H-level. With this, the flip-flop 7 outputs an H-level. In other words, the overcurrent protection circuit 1 sends a shutdown instruction to the power supply circuit.

In the NOR gate 9, an H-level is inputted from the flip-flop 7, and therefore the NOR gate 9 outputs an L-level signal. Therefore, in the time frame C, the switch S5 is turned off, and therefore it becomes possible that the terminal voltage Vs becomes lower than 1.1 V.

In the OR gate 12, an H-level is inputted from the flip-flop 7, and therefore the OR gate 12 outputs an H-level signal regardless of the output of the flip-flop 7. That is, until the terminal voltage Vs becomes below 0.2 V, the hysteresis amplifier 13 continuously outputs an H-level. Therefore, the flip-flop 7 continuously outputs an H-level without being reset. For this reasons, the OR gate 12 makes the switch S4 turn off continuously in the time frame C.

As will be understood from the above, in the time frame C, since the capacitor 21 is not charged by the current source 2 in the time frame C, discharging of the capacitor 21 is continued by the current source 3. As a result, the terminal voltage Vs will drop. Until the terminal voltage Vs becomes below 0.2 V, the overcurrent protection circuit 1 continuously sends a shutdown instruction to the power supply circuit. Thus, utilizing the capacitor 21, the term during which the shutdown is maintained can be adjusted.

When the terminal voltage Vs becomes below 0.2V, the hysteresis amplifier 13 outputs an L-level signal, causing reset of the flip-flop 7. With this, the overcurrent protection circuit 1 deactivates shutdown instruction and again instructs soft restart.

Figure 3:
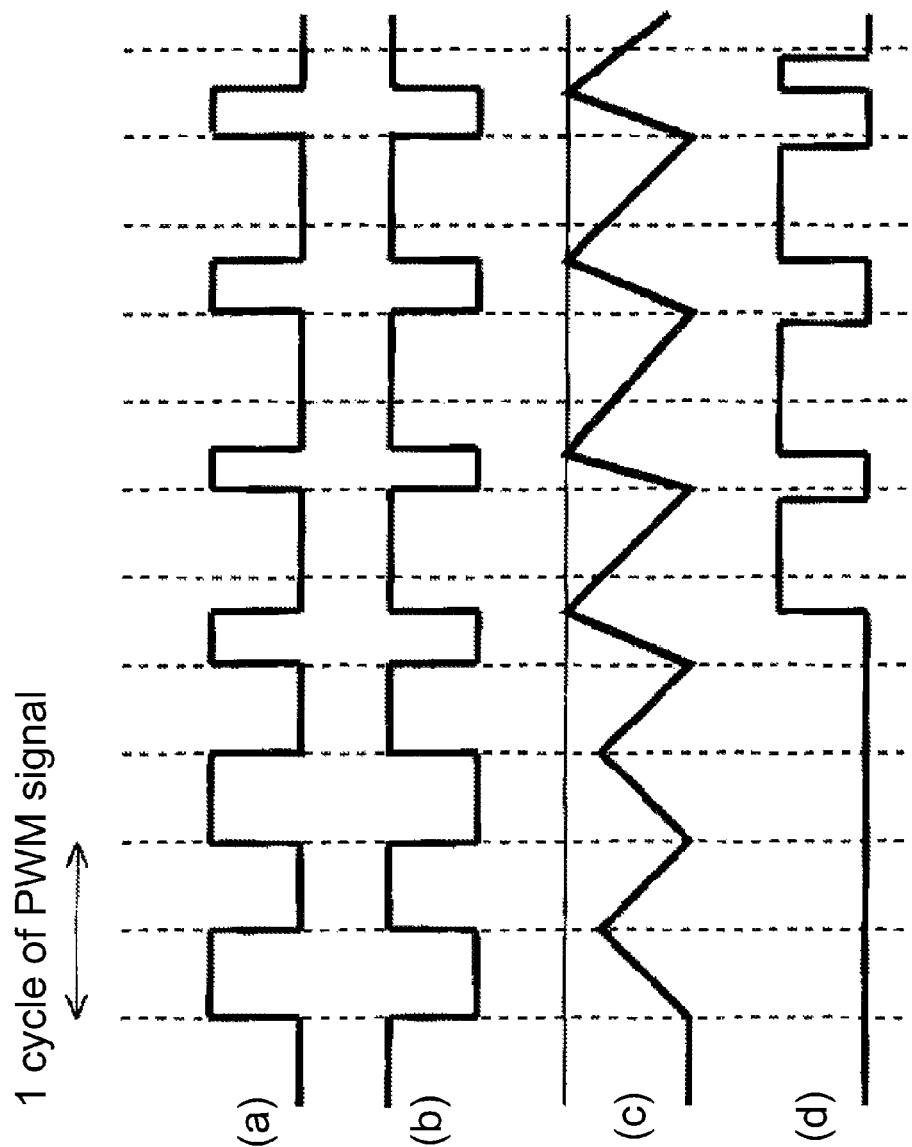
FIG. 3 is an explanatory view showing signal processing of the overcurrent detection circuit according to the embodiment of the present invention.

Referring to FIG. 3, input and output signals of the flip-flop 7 will be explained concretely.

In FIG. 3, (*a*) denotes a PWM signal for performing switching control of the power supply circuit. For example, in the power supply circuit 100 shown in FIG. 4, the PWM signal corresponds to a signal to be inputted to the gate of the output transistor 141.

In FIG. 3, (*b*) denotes an inversion PWM signal that the PWM signal is inverted by the NOT gate 19, and a signal to be inputted to the start terminal of the flip-flop 8.

In FIG. 3, (*c*) shows a waveform of a sense current corresponding to a current flowing through the output transistor. When the sense current exceeds an overcurrent set value, it is considered that an overcurrent flows through the output transistor. The PWM signal continuously causes a H-level pulse at a constant frequency. When an overcurrent is detected, the PWM signal becomes an L-level at the one pulse. In other words, although the output transistor is switching-controlled at a constant frequency, when an overcurrent is detected, the output transistor will be turned off immediately, and again turned on when the subsequent H-level pulse is inputted. Thus, when an overcurrent is detected, the sense current decreases until the output transistor is turned on subsequently.

In FIG. 3, (*d*) shows a pulse created by the sense current, and is an overcurrent detection signal to be inputted to the reset terminal of the flip-flop 8. The overcurrent detection signal will rise when it exceeds an overcurrent set value. Depending on the falling period of the PWM signal, the overcurrent detection signal decreases. With this, during the period in which no overcurrent is detected, the overcurrent detection signal keeps the L-level, and becomes an H-level pulse when an overcurrent is detected. When an overcurrent is continued, the overcurrent detection signal outputs an H-level pulse every period of the PWM signal.

Figure 2:
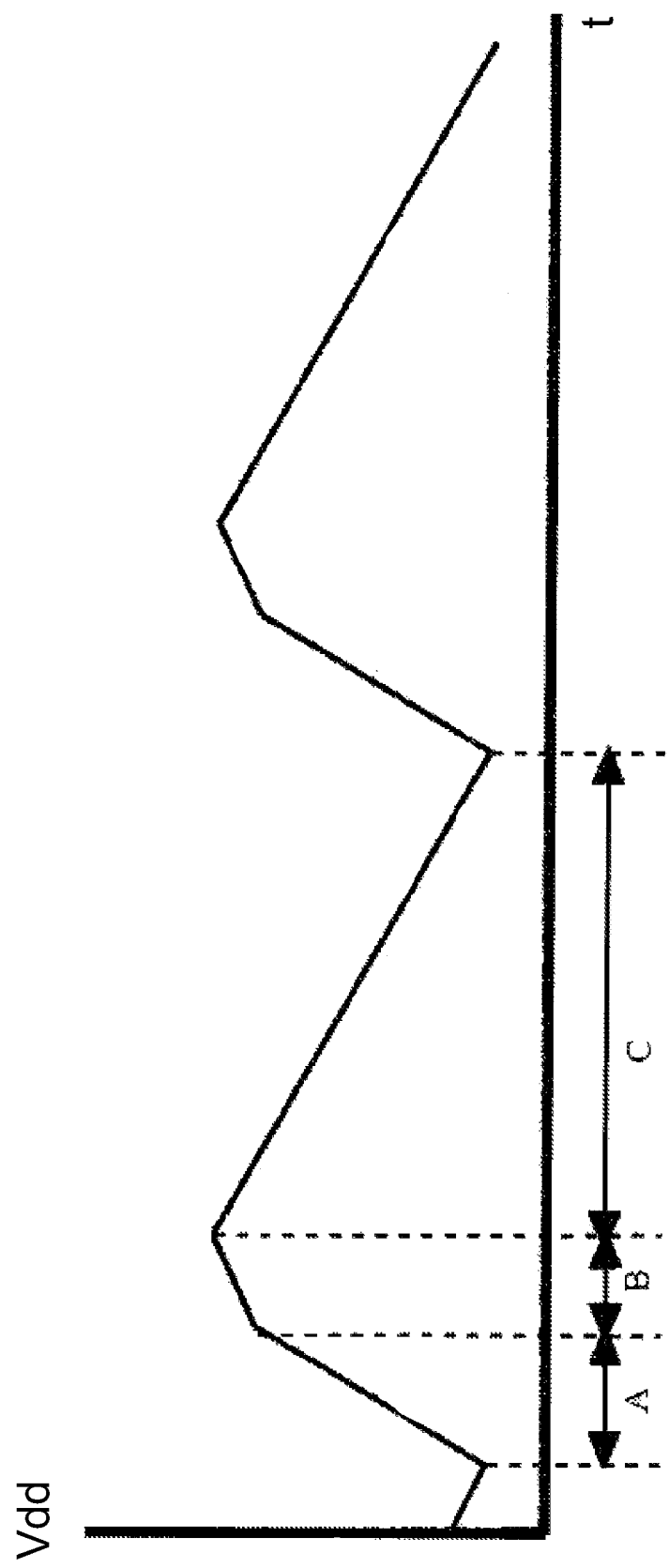
FIG. 2 is an explanatory view showing operation changes of the overcurrent protection circuit according to the embodiment of the present invention.

With this structure, considering the function during the time period B shown in FIG. 2, during the time period in which no overcurrent is detected continuously, the switch S4 is turned off naturally, and the terminal voltage Vs is maintained to 1.1 V.

In cases where an overcurrent flows temporarily or an overcurrent is detected erroneously, the switch S4 is turned on, and therefore the terminal voltage Vs increases from 1.1 V. In these cases, however, it will not continue, the turn-off ratio of the switch S4 increases before the terminal voltage Vs increases to 1.3 V, causing discharging of the capacitor 21 by the current source 2, which decreases the terminal voltage Vs to 1.1 V.

On the other hand, when an overcurrent flows continuously due to, e.g., short circuit, the turn-on ratio of the switch S4 increases. In this case, since the current source 2 flows a current larger than the current source 3, the terminal voltage Vs increases continuously. When the terminal voltage Vs increases to 1.3 V, the overcurrent protection circuit 1 causes shutdown of the power supply circuit.

As discussed above, in the overcurrent protection circuit 1, utilizing the capacitor 21 used to perform soft-start of the power supply circuit, an overcurrent error detection can be prevented, and the term from the shutdown of the power supply circuit to the restart can be adjusted.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

In the aforementioned embodiment, the overcurrent protection circuit is mounted in the power supply circuit 1 shown in FIG. 4. However, the present invention is not limited to it.

The overcurrent protection circuit 1 can also be applied to a power supply circuit in which an output transistor is provided at a ground side in addition to the power side and these transistors are switch-controlled in a complementary manner. In this case, it can be configured such that the sense current shown in FIG. 3(c) can be a current flowing through the power side output transistor, a current flowing through the ground side output transistor, or both.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An overcurrent protection circuit applied to a power supply circuit which performs soft-start at the time of activation depending on a terminal voltage of a terminal to which a capacitor is connected, the overcurrent protection circuit is configured to operate in accordance with operation modes comprising:

a first operation mode in which when the power supply circuit is activated, the capacitor is charged until the terminal voltage reaches a first voltage;

a second operation mode in which depending on a time period in which a current flowing through an output transistor of the power supply circuit exceeds a predetermined value, the capacitor is charged so that the terminal voltage increases from the first voltage toward a second voltage, and the power supply circuit is shut down when the terminal voltage reaches the second voltage; and a third operation mode in which when the power supply circuit is shut down, the capacitor is discharged until the terminal voltage reaches a third voltage, and the shutdown of the power supply circuit is released when the terminal voltage reaches the third voltage.

2. The overcurrent protection circuit as recited in claim 1, wherein in the second operation mode, it is detected whether a current flowing through the output transistor exceeds the predetermined value in accordance with a period of a PWM signal to be inputted to a control terminal of the output transistor.

3. The overcurrent protection circuit as recited in claim 1, wherein when the power supply circuit is shut down, the output transistor stops the switching-control.

4. The overcurrent protection circuit as recited in claim 2, wherein when the power supply circuit is shut down, the output transistor stops the switching-control.

5. A method of protecting a power supply circuit from an overcurrent flowing through an output transistor of the power supply circuit, wherein the power supply circuit performs soft-start at the time of activation depending on a terminal voltage of a terminal to which a capacitor is connected, the method comprising:

charging the capacitor until the terminal voltage reaches a first voltage when the power supply circuit is activated, which is defined as a first operation mode;

depending on a time period in which a current flowing through an output transistor of the power supply circuit exceeds a predetermined value, charging the capacitor so that the terminal voltage increases from the first voltage toward a second voltage, and shutting down the power supply circuit when the terminal voltage reaches the second voltage, which is defined as a second operation mode; and discharging the capacitor until the terminal voltage reaches a third voltage when the power supply circuit is shut down, and releasing the shutdown of the power supply circuit when the terminal voltage reaches the third voltage, which is defined as a third operation mode.

6. The method of protecting a power supply circuit as recited in claim 5, wherein in the second operation mode, it is detected whether a current flowing through the output transistor exceeds the predetermined value in accordance with a period of a PWM signal to be inputted to a control terminal of the output transistor.

7. The method of protecting a power supply circuit as recited in claim 5, wherein when the power supply circuit is shut down, the output transistor stops the switching-control.

8. The method of protecting a power supply circuit as recited in claim 6, wherein when the power supply circuit is shut down, the output transistor stops the switching-control.

* * * * *